May 31, 1938.　　　　D. E. GOMMEL　　　　2,119,431
POWER TRANSMISSION MECHANISM
Filed Sept. 16, 1935　　　3 Sheets-Sheet 1
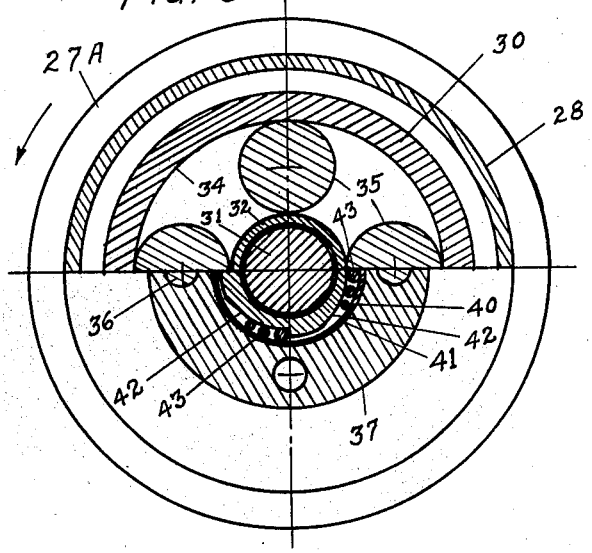
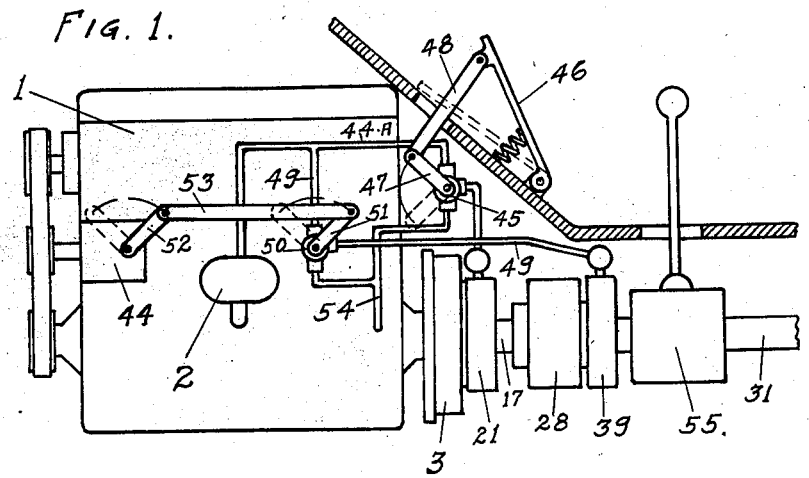
INVENTOR.
Dewey E. Gommel.

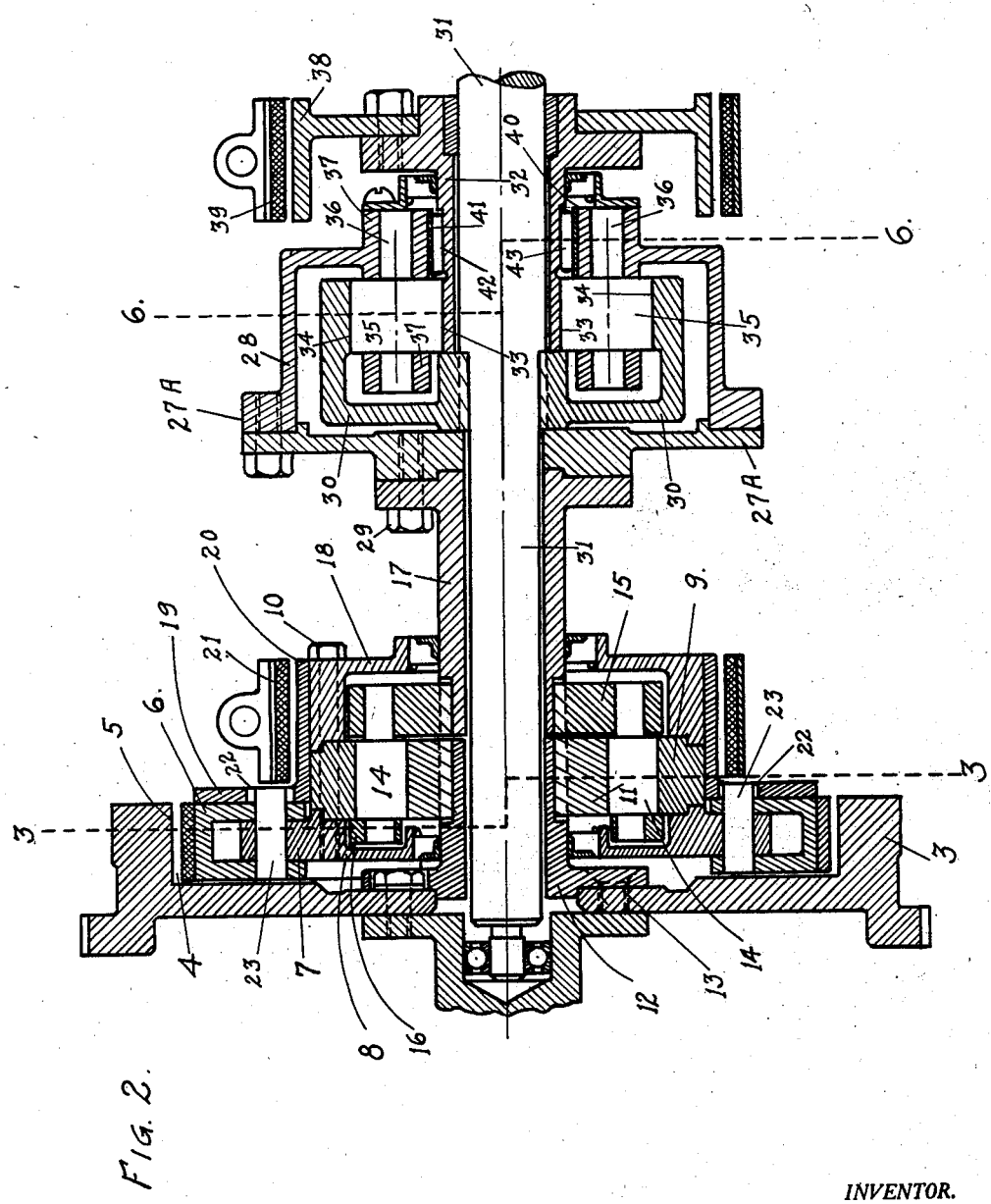

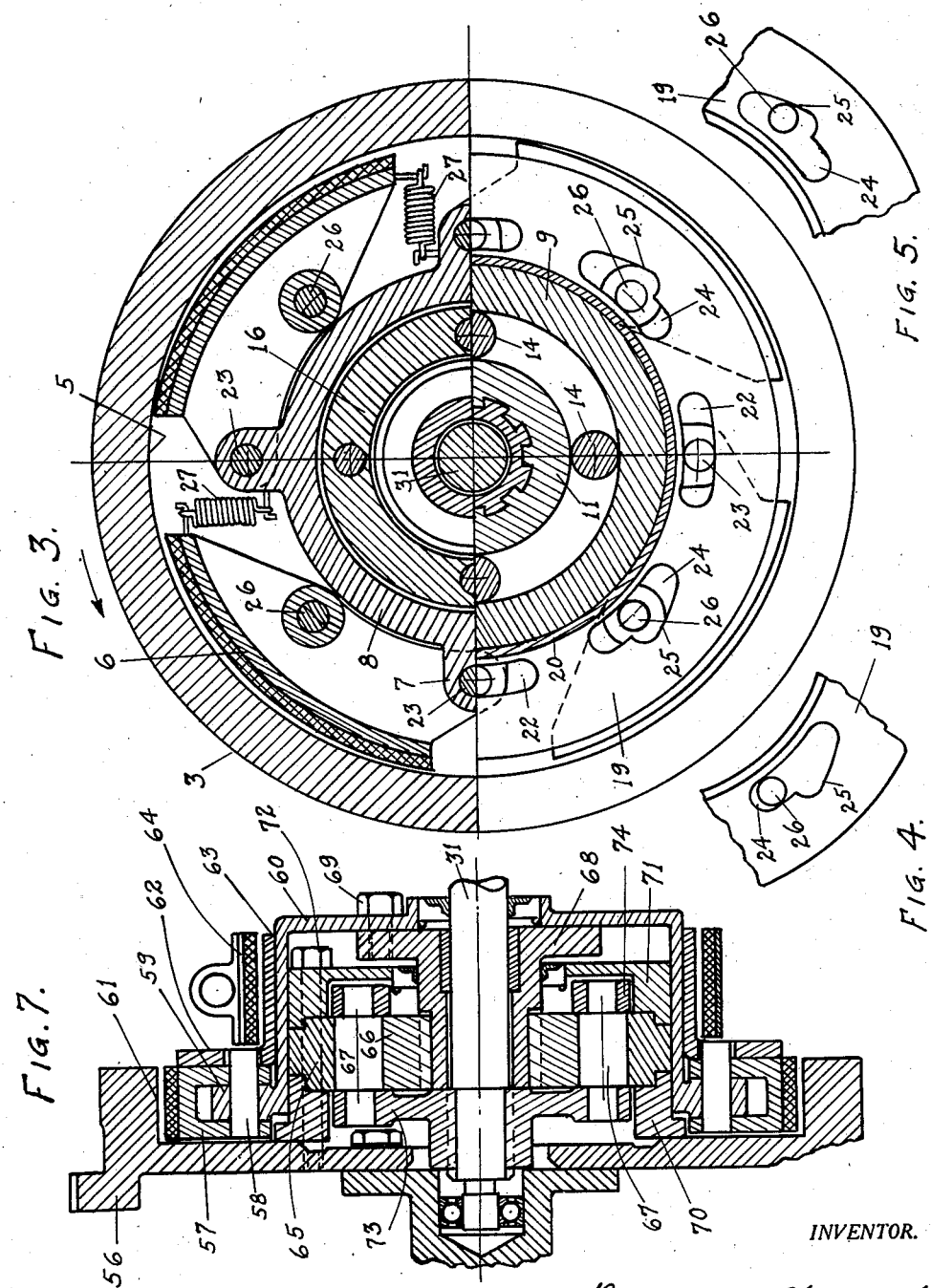

Patented May 31, 1938

2,119,431

UNITED STATES PATENT OFFICE 2,119,431

POWER TRANSMISSION MECHANISM

Dewey E. Gommel, Indianapolis, Ind.

Application September 16, 1935, Serial No. 40,776

6 Claims. (Cl. 74—260)

This invention relates to power transmission mechanism designed primarily for use in connection with motor propelled vehicles although it will be understood that it may be used for transmitting power to machines of any type requiring variable speeds.

One feature of the invention is the provision of means for obtaining a number of driving speeds from the motor.

An additional feature of the invention is the provision of means for changing the gear ratios without losing the torque of the engine during the gear ratio changes.

A further feature of the invention is the provision of means for utilizing the oil pressure of the motor for operating the transmission mechanism.

A further feature of the invention is the provision of means for controlling the oil pressure operating mechanism either manually or automatically.

A further feature of the invention is the provision of an overdrive gear ratio mechanism which may be automatically or manually controlled.

A further feature of the invention is the provision of means for retaining the mechanism in second gear or low gear regardless of the speed of the motor.

A further feature of the invention is the provision of means for shifting the mechanism from high gear to second gear, regardless of the speed of the motor.

A further feature of the invention is in so constructing the mechanism that the motor may remain in high gear when the vehicle is being driven at a very low speed.

A further feature of the invention is the provision of a mechanism that may be controlled in its forward drives from a single source.

A further feature of the invention is the provision of a centrifugal, two speed clutch mechanism which may operate with or replace the ordinary clutch mechanism.

A further feature of the invention is the provision of means for locking the centrifugal clutch mechanism in inoperative position when desired.

A further feature of the invention is in so constructing the centrifugal clutch mechanism that the unit will be held against free wheeling except at very low speeds.

A further feature of the invention is in so constructing the driving mechanism that the car may be stopped solely by operating the conventional brake mechanism common to all cars and without stalling the motor.

A further feature of the invention is the provision of means for automatically disconnecting the motor from the driving axle of the car before the motor is brought to a stop from an overload.

A further feature of the invention is the provision of means whereby different gear ratios may be obtained without declutching the motor.

A further feature of the invention is in so constructing the transmission mechanism that the motor remains connected with the driving wheels at all times in the higher speeds.

In the accompanying drawings,

Figure 1 is a diagrammatic view of a motor with the transmission mechanism attached thereto.

Figure 2 is a central longitudinal sectional view through the transmission mechanism.

Figure 3 is a transverse sectional view as seen along line 3—3, Fig. 2.

Figures 4 and 5 are detail elevations showing different positions of the clutch shoe pins with respect to their cooperating slots.

Figure 6 is a sectional view as seen along line 6—6, Fig. 2, and,

Figure 7 is a sectional view showing a slightly modified structure.

Referring to the drawings in which like characters designate like parts throughout the several views, the numeral 1 designates a motor of the conventional or any suitable type, having an oil pressure pump 2 and a fly wheel 3 associated therewith.

The fly wheel 3 is fixed to the motor 1 and has a recess 4 in its outer face, the peripheral wall 5 of which forms a friction surface for engagement with clutch shoes 6. These clutch shoes are preferably constructed channel shaped in cross section and have one of their ends pivoted to ears 7, projecting from the peripheral edge of a plate like member 8, which is in turn connected with a ring like member 9 by means of bolts 10.

Cooperating with the member 9 is a disc like member 11, which is fixed to a sleeve 12, said sleeve being in turn fixed to the fly wheel 3 by screws 13 or otherwise, so that said sleeve 12 and disc 11 will be driven with the fly wheel 3. Intermeshing between the member 9 and the member 11 are rollers 14, the pivotal ends of which are mounted in bearing discs 15 and 16 respectively, the disc 15 being fixed to a sleeve 17, which is in alinement with the sleeve 12.

The bolts 10 also serve to secure a housing 18 in position over the disc 15 and interlock the plate 8, member 9 and housing 18 together in one unit. Positioned over the outer face of the clutch shoes 6 is a plate 19, which fits around the periphery of the member 9 and has a laterally extending flange 20, forming a substantially L-shaped structure in cross section, the flange 20 extending over the peripheral edges of the member 9 and housing 18 and provides a brake surface for a brake band 21.

The plate 19 has a series of elongated slots 22 therethrough through which extend the outer ends of pivot pins 23, employed for pivoting the clutch shoes 6 to the ears 7, the elongation of the slots 22 permitting a limited rotation of the plate 19 with respect to the members 8, 9 and 18. The plate 19 is also provided with additional slots 24, which have cammed portions 25 in their length, the slots 24 serving to receive the outer ends of pins 26, carried by the free ends of the clutch shoes 6. The clutch shoes 6 are normally held inwardly and out of contact with the friction face 5 by means of springs 27, the tension of said springs being such that it will be easily overcome when rotation is set up in the member 8.

When the pins 26 are in the position shown in Fig. 4, the clutch shoes 6 will be positively locked out of engagement with the friction face 5, but when said pins are in the position shown in Fig. 5, the shoes 6 will be free to engage the face 5, so that the shoes will readily swing outwardly by centrifugal force when the parts to which they are attached are rotated.

Associated with the above described transmission mechanism is an over drive unit or planetary two speed transmission 27ª, comprising a gear carrying frame 28, which is fixed to the sleeve 17 by bolts 29 or otherwise, within which is mounted a friction ring 30, said ring being fixed to the main driving shaft 31, extending from the fly wheel 3 to the rear driving axle of the vehicle (not shown).

A sleeve 32 is positioned around the shaft 31 with a portion thereof extending into the frame 28 and having a friction face 33 thereon, the friction face 33 registering with the friction face 34 of the ring 30. Cooperating with the friction faces 33 and 34 are friction rollers 35, each having spindles 36 mounted in bearings 37. The projecting end of the sleeve 32 has a brake drum 38 thereon with which cooperates a brake band 39, by means of which the rotation of the sleeve 32 is controlled.

The opening 40 in the frame 28, through which the sleeve 32 passes, is provided with a lining 41 which forms a friction face, and the face of the sleeve 32 registering with the lining 41 is provided with one or more cammed surfaces 42 with which cooperate rollers 43, thus forming an overrunning clutch unit. This mechanism will permit the frame 28 to revolve faster than the sleeve 32, but should the speed of the sleeve become greater than the speed of the frame, these parts will lock together and run as a unit.

The brake band 39 may be controlled in any suitable manner but preferably by means of a centrifugal speed governor 44, which may be set to operate at a predetermined speed of the motor for locking or releasing the brake band 39. With this construction, when the motor exceeds the speed at which the governor is set, the governor will automatically operate to clamp the brake band 39 around the drum 38, thus stopping the rotation of the sleeve 32; but when the speed of the motor has been reduced below the prescribed speed, the governor will again automatically operate to release the brake band and permit the sleeve 32 to again rotate in unison with the housing 28.

The brake bands 21 and 39 are automatically operated from the oil pressure of the motor, through the oil conveying pipe 44A, extending from the pressure pump 2 to the brake band 21, said pipe 44A having in its length a three way valve 45, which opens and closes communication through said pipe to the brake band 21, a control pedal 46 being mounted at any convenient position to receive pressure, preferably from the foot and is attached to the operating lever 47 of the valve 45 by a link 48, through the medium of which the valve 45 is operated.

Connected with the pipe 44A is a branch pipe 49, which connects with the brake band 39, said branch pipe having in its length a three way valve 50, the lever 51 of which is connected with the lever 52 of the speed governor 44 by means of a link 53, so that the valve 50 will be opened or closed by the operation of the governor. The valves 45 and 50 have a common return pipe 54.

It is to be understood that the members 9, 11 and 14 and the members 33, 34 and 35 may be in the nature of conventional gears, but the friction features are preferred as the rollers, under high load, will carry the speed ratio changes without added stress on any parts of the units, except the rollers, discs and rings themselves.

With this invention, all shifting of gears, except the reverse gear 55, may be eliminated as well as dispensing with the conventional clutch and its operating mechanism, although, if desired, the device may be used in connection with vehicles having the conventional operating parts, in which event a substitute flanged disc or the like (not shown) is to be provided, which will be driven from the conventional clutch.

The foregoing described speed clutch unit mechanism is timed at a ratio of 2 to 1 or more in the low gear ratio, such as 2½ to 1 and four forward driving gear ratios are attained and the gear shifts made without losing the torque of the motor, but when two gear ratios only are desired, as for race cars or the like, that form of clutch mechanism shown in Fig. 7 is used, said structure comprising a fly wheel 56 in which are mounted clutch shoes 57, said clutch shoes having pivot pins 58, which project through ears 59 carried by a housing 60.

The clutch shoes 57 engage a clutch face 61 on the fly wheel 56, when said clutch shoes are thrown outwardly by centrifugal force. Extending over the outer face of the clutch shoes 57 is a plate 62, which is constructed the same as the plate 19 and operates in conjunction with the clutch shoes 57 in the same manner as the plate 19 cooperates with the pins of the clutch shoes 6, said plate 62 likewise having a flange 63 which fits around the peripherrl surface of the housing 60 and provides a friction surface for the brake band 64.

Within the housing 60 is a ring-like member 65, a disc member 66, rollers 67 and a sleeve 68, the members 65, 66 and 67 being constructed similar to the members 9, 11 and 14, and co-acting in the same manner. The member 66 is keyed or otherwise fixed with the sleeve 68, said sleeve being in turn fixed to the housing 60 by bolts 69 or otherwise, so that the sleeve and housing will operate in unison. Guiding or reinforcing members 70 and 71 are positioned on opposite faces of the member 65 and said parts are fixed with the fly wheel 56 by means of bolts or the like 72.

One end of the rollers 67 is mounted in a spider 73, the hub portion of which is keyed or otherwise fixed to the driving shaft 31, the opposite ends of the rollers 67 being mounted in the bearing disc 74. This form of speed-clutch unit mechanism is timed at a ratio of substantially 2 to 1 or less, such as 1½ to 1 and the gears may be shifted from high to second or second to high, without interrupting or losing the torque of the engine.

In operation, the motor is started running in the conventional manner, or the car may be pushed or pulled for starting the motor if the starting mechanism will not function. The shift lever for the reverse gear 55 is then moved to the forward drive position, if not already there.

When the motor is started, the ring 9 is rotated in reverse motion to the fly wheel 3 and as the plate 19 has a limited free movement with respect to the ring 9 the plate 19 will remain substantially stationary until the pins 26 have assumed the position shown in Fig. 4. The shoes 6 are now locked in their inward positions and cannot be thrown outwardly into engagement with the friction face 5 by centrifugal force regardless at what speed the unit is operated.

After the motor has become sufficiently warm, the control pedal 46 is depressed for operating the three way valve 45 for directing the engine oil pressure to the brake band 21 and locking the brake band around the flange 20 for holding said flange and ring against rotation.

The unit is now in low gear ratio and the drive is from fly wheel 3, through sleeve 12, disc 11, rollers 14 to disc 15 and disc 15 being splined to the sleeve 17, drives unit 27ª. Unit 27ª is in 1 to 1 gear ratio, but when the speed of the motor is reached the governor 44 operates and clamps brake band 39 around drum 38 which gives the overdrive gear ratio of the first unit low gear ratio or the second gear ratio.

As soon as the vehicle receives enough momentum, the control pedal 46 can be released and this operates the three way valve 45, thus releasing the brake band 21, this operation releasing the members 8, 9 and 18, but due to the momentum of the vehicle in motion, the ring 9 and clutch shoes 6 will travel in the same direction as the fly wheel and, due to centrifugal force, the pins 26 being in the position shown in Fig. 5, the clutch shoes 6 will be thrown outwardly and frictionally interlock with the friction face 5 thus placing the unit in direct drive.

When the unit is in high gear and the load becomes too great for the motor and the motor slows down so that the clutch shoes 6 lose their centrifugal force and wedging action, the unit will free wheel until the control pedal 46 is again depressed to throw the driving unit into low gear. This not only protects the motor, but prevents ultimate stalling of the motor.

When the unit is operating at high speed and it is desired to return to low gear, the pedal 46 is depressed, causing the brake band 21 to clamp member 20 and thus hold the plate 19 stationary. This action will cause the pins 26 to travel along the cam faces 25 and the shoes 6 be drawn inwardly out of contact with the friction face 5.

When the sleeve 17 is rotating, motion is imparted to the overdrive unit 27ª through the medium of the gear carrying frame 28, which causes the friction rollers 35 to rotate and drive the sleeve 32, and as the ring 30, carrying the friction face 34, is splined to the driving shaft 31, and as said driving shaft is held stationary by its connection with the rear axle of the vehicle, when the vehicle is stationary, the sleeve 32 will rotate at a greater speed than the frame 28, but to cause said sleeve 32 to rotate in unison with the frame 28, the over-running clutch unit is brought into operation for locking the sleeve 32 and frame 28 together and causing ring 30 to rotate therewith, thus imparting driving action to the shaft 31 and causing all parts of the over-drive unit to rotate in unison with the sleeve 17.

In order to lessen the strain on the motor and at the same time increase the driving speed of the shaft 31 over the speed of the motor, power is applied to the brake band 39 for clamping the same around the brake drum 38, thus stopping the rotation of the sleeve 32. This will cause the friction ring 30 to travel at an increased speed over the casing 28 and sleeve 17, increasing the driving speed of the shaft 31, while the fly wheel and parts associated therewith will travel at their original speeds.

By providing the centrifugal speed governor 44 and setting the same at a predetermined speed and providing the three way valve 50 in the pipe 49, when the speed of the motor exceeds the speed set by the governor, the three way valve 50 will be automatically operated and the brake band 39 clamped around the drum 38, thus locking the sleeve 32 of the over-drive unit stationary and increasing the speed of the driving shaft 31. As soon as the speed at which the governor is set is again attained, it will automatically return the valve 50 to original position and release the brake band 39 from the drum 38.

While I have shown and described the brake bands 21 and 39 as being operated from the oil pressure of the motor, it will be understood that these parts may be operated as well by compressed air or other fluids or vacuum and that the three way valves may be operated manually or automatically as desired.

In order to stop the vehicle it is but necessary to apply the conventional brake mechanism to the driven parts of the vehicle, which action will instantly slow the speed of the shaft 31 and release the clutch shoes 6 from the fly wheel 3, due to the shoes 6 losing their centrifugal outward force, thus disconnecting the motor and permitting the vehicle to be brought to a full stop by continued pressure of the conventional brakes.

With this invention the speed ratio changes may be made without affecting the torque of the motor, with the motor under load or without declutching the motor. Also, due to the lock out feature of the clutch shoes, the intermediate members may freely rotate in reverse direction of rotation at any speed.

What I claim is:

1. The combination with a motor, a fly wheel structure, and a driving shaft, of a planetary power transmission mechanism disposed between said fly wheel structure and said driving shaft, said transmission mechanism comprising a planetary clutch driving gear unit and a planetary over-drive gear unit connected together, and manually and automatically operated means operating independently of each other for controlling the operation of said driving gear unit and overdrive gear unit respectively, whereby four gear ratio changes may be made without losing the torque of the motor.

2. The combination with a motor, a fly wheel structure, and a driving shaft, of a planetary power transmission mechanism disposed between said fly wheel structure and driving shaft, said transmission mechanism comprising a planetary clutch driving gear unit and a planetary overdrive gear unit connected together, and manually and automatically operated means operating independently of each other for controlling the operation of said driving gear unit and overdrive gear unit respectively, whereby four gear ratio changes may be made without de-clutching the motor.

3. The combination with a motor, a fly wheel structure, and a driving shaft, of a planetary power transmission mechanism disposed between said fly wheel structure and said driving shaft, said transmission mechanism comprising a planetary clutch driving gear unit and a planetary over-drive gear unit connected together, and manually and automatically operated means operating independently of each other for controlling the operation of said driving gear unit and over-drive gear unit respectively, whereby four gear ratio changes may be made with the motor under load.

4. A planetary power transmission mechanism for motor propelled vehicles, a planetary power gear unit, and a single manually operated means connected with said gear unit for operating the power gear unit for obtaining a low gear ratio, an engine speed controlled governor means for obtaining a second gear ratio, a direct drive high gear ratio obtained through said single manually operated means, and an over-drive gear ratio of the direct drive obtained through said engine speed controlled governor means, all of said ratios being derived by moving said manually operated means to two positions only and automatically operated cam means for keeping said power gear unit in de-clutched condition while the vehicle is stationary or moving at very low speed.

5. In a power transmission mechanism for motors, comprising a fly wheel structure, a planetary power unit adjacent to said fly wheel structure, a planetary over-drive unit cooperating with said power unit, an engine speed controlled governor forming the operating means therefor, and an over-running clutch unit within said over-drive unit adapted to automatically lock said over-drive unit with said power unit and cause them to operate in unison when the engine speed controlled governor is inactive.

6. In a power transmission mechanism, a motor, a multiple speed gear unit associated therewith having a plurality of gear ratios, a planetary over-drive unit connected with said multiple speed gear unit, a driving shaft connected with said over-drive unit, a governor controlled and operated directly by the speed of the motor, and means for utilizing said governor for operating said over-drive unit for controlling the outgoing speed of said driving shaft whereby two speeds, a direct drive and an over-drive of the direct drive will be obtained automatically for each gear ratio in the multiple speed gear unit while the unit is under load.

DEWEY E. GOMMEL.